United States Patent Office.

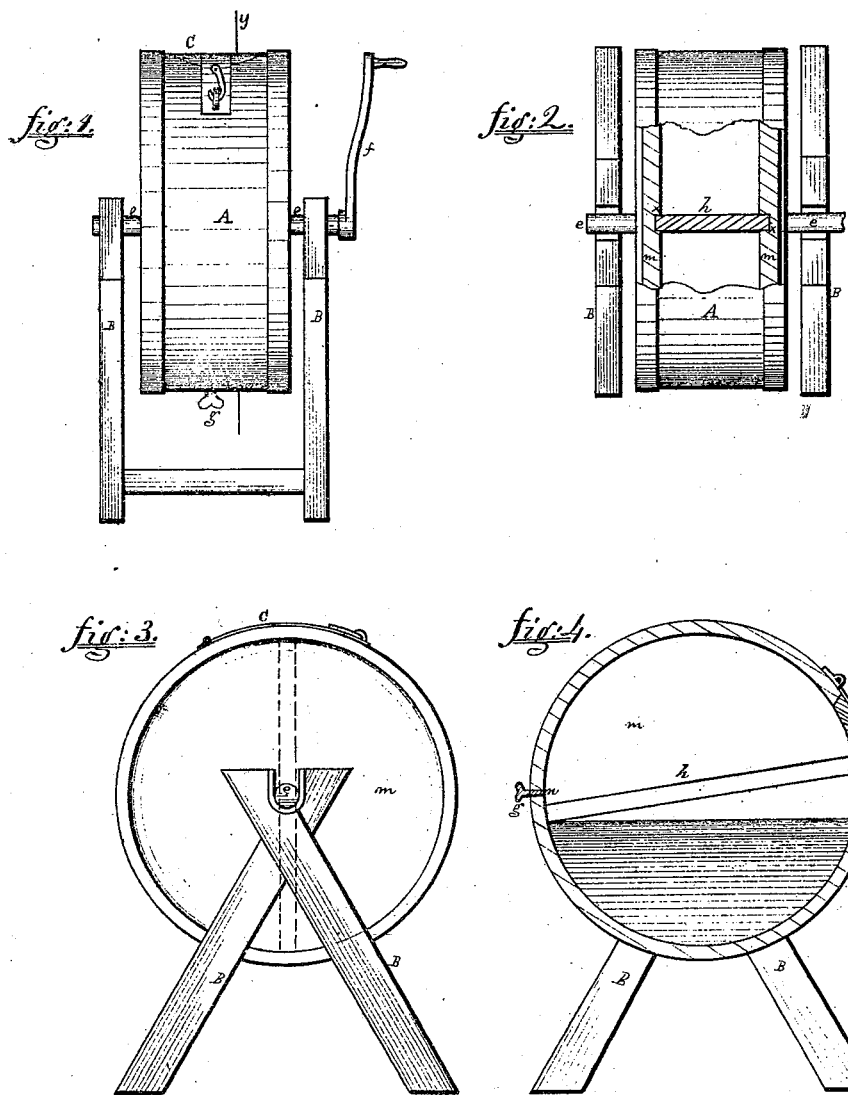

TIMOTHY COFFIELD AND BENEDIC EGLI, OF NATRONA, PENNSYLVANIA.

Letters Patent No. 108,969, dated November 8, 1870.

IMPROVEMENT IN CHURNS.

The Schedule referred to in these Letters Patent and making part of the same.

*To all whom it may concern:*

Be it known that we, TIMOTHY COFFIELD, of Natrona, in the county of Allegheny and State of Pennsylvania, and BENEDIC EGLI, a citizen of Switzerland, now residing in the aforesaid town of Natrona, have invented a new and useful Improvement in Churns; and we do hereby declare that the following is a full, clear, and exact description thereof, reference being had to the accompanying drawing and to the letters of reference marked thereon.

The nature of our invention consists in a "barrel-churn," provided with a fixed dasher, arranged in the barrel at right angle to the axis of rotation of said barrel.

To enable others skilled in the art to make and use our invention, we will proceed to describe its construction and operation.

In the accompanying drawing which forms part of our specification—

Figure 1 is a front elevation of our improvement in barrel-churns.

Figure 2 is a top view or plan of the same.

Figure 3 is an end view of the same.

Figure 4 is a transverse and vertical section of the same at line $y$, fig. 1.

In the accompanying drawing—

A represents the barrel of the churn, and is provided with a door, C, which is held closed by a strap, or "hinge-strap," hook and staple, such as is used in the ordinary construction of barrel-churns.

To the ends, $m$, of the barrel A are secured bearings, $e$, which are fitted in the pedestal B B.

One of the bearings $e$ is provided with a crank, $f$.

In the ends of the barrel are grooves $x$, in which is fitted the dasher $h$, which extends across the barrel A, and is so arranged in the barrel that one end of it will be about the center of the door C, as shown in fig. 4.

The barrel A is provided with a small opening, $n$, which is closed with a plug, $g$.

The dasher $h$ may be provided with a series of openings, and may be, in width, equal to the longest diameter of the door C.

As the construction of our improvement in barrel-churns will be readily understood from the foregoing description, and by reference to the accompanying drawing, we will therefore proceed to describe its operation, which is as follows:

The cream or milk is prepared in the ordinary manner and poured into the churn, and the door C so closed as to prevent leakage of the cream or milk. The barrel A is then revolved, through the medium of the crank $f$, and the revolving of the barrel A will cause the dasher $h$ to strike the milk and agitate it, so as to separate the butter from it.

After revolving the barrel A for two or three minutes the plug $g$ should be removed for the purpose of allowing the heat and gas which accumulates in the barrel to escape, otherwise the butter will be "scalded." After the heat and gas have escaped the plug $g$ is again inserted, and the barrel revolved until it is again necessary to remove the plug $g$, which should be done every two or three minutes, until the churning is completed, which will require about ten minutes for the rotation of the barrel A.

The advantages of our improvement in the barrel-churn consists in preventing leakage of the cream or milk at the bearings $e$ of the barrel A, and in the ease and facility of cleaning, and diminishing the labor of churning, and also avoiding the use of hot water for obtaining the desired temperature (60°) of the cream or milk for churning.

The agitation of the cream or milk in our churn will heat it to the proper temperature for obtaining the most perfect separation of the butter from it.

After the butter has been separated from the cream or milk by the churning process, as hereinbefore described, it is then gathered, washed, and manipulated in the usual manner.

We do not claim, broadly, the barrel or cylinder A, with a fixed dasher, for such device is described in the patent granted June 16, 1868, to F. A. Jewett, and may also be seen in other patents.

Having thus described the nature, construction, and operation of our improvement,

What we claim as of our invention, is—

The arrangement of the cylinder A, door C, dasher $h$, and plug $g$, the whole being constructed, arranged, and operating substantially as herein described, and for the purpose set forth.

TIMOTHY COFFIELD.
BENEDIC EGLI.

Witnesses:
JAMES J. JOHNSTON,
A. C. JOHNSTON.